United States Patent [19]

Noone et al.

[11] Patent Number: 5,383,087
[45] Date of Patent: Jan. 17, 1995

[54] MULTI-LAYER FUEL AND VAPOR TUBE

[75] Inventors: David L. Noone, Southfield; Frank L. Mitchell, Rochester, both of Mich.

[73] Assignee: ITT Corporation, New York, N.Y.

[21] Appl. No.: 896,824

[22] Filed: Jun. 11, 1992

Related U.S. Application Data

[63] Continuation-in-part of Ser. No. 868,754, Apr. 14, 1992.

[51] Int. Cl.⁶ .................. F16L 11/04; F16L 11/127
[52] U.S. Cl. ..................................... 361/215; 138/137
[58] Field of Search ............... 138/124, 125, 126, 127, 138/137, 138, 140, 141, 177, DIG. 1, DIG. 3, DIG. 7; 428/36.91; 361/215

[56] References Cited

U.S. PATENT DOCUMENTS

| | | | |
|---|---|---|---|
| 3,070,132 | 12/1962 | Sheridan | 361/215 |
| 3,473,087 | 10/1969 | Slade | 361/215 |
| 3,561,493 | 2/1971 | Maillard et al. | 138/137 X |
| 3,828,112 | 8/1974 | Johansen et al. | 361/215 |
| 3,907,955 | 9/1975 | Viennot | 361/215 X |
| 4,059,847 | 11/1977 | Phillips et al. | 361/215 |
| 4,272,585 | 6/1981 | Strassel | 138/137 X |
| 4,330,017 | 5/1982 | Satoh et al. | 138/137 X |
| 4,675,780 | 6/1987 | Barnes et al. | 361/215 |
| 4,685,090 | 8/1987 | Krevor | 138/137 X |
| 4,880,036 | 11/1989 | Kitami et al. | 138/137 |
| 4,887,647 | 12/1989 | Igarashi et al. | 138/137 X |
| 4,984,604 | 1/1991 | Nishimura | 138/137 X |
| 5,019,309 | 5/1991 | Brunnhofer . | |
| 5,038,833 | 8/1991 | Brunnhofer . | |
| 5,076,329 | 12/1991 | Brunnhofer . | |
| 5,142,782 | 9/1992 | Martucci | 138/125 |
| 5,143,122 | 9/1992 | Adkins | 361/215 X |

FOREIGN PATENT DOCUMENTS

| | | |
|---|---|---|
| 2577168 | 8/1986 | France . |
| 2577564 | 8/1986 | France . |
| 3821723 | 9/1989 | Germany . |
| 4001126 | 12/1990 | Germany . |
| 9007303.7 | 2/1991 | Germany . |
| 3942353 | 6/1991 | Germany . |
| 3942354 | 6/1991 | Germany . |
| 4006870 | 7/1991 | Germany . |
| 2204376 | 11/1988 | United Kingdom . |

*Primary Examiner*—A. D. Pellinen
*Assistant Examiner*—Fritz Fleming
*Attorney, Agent, or Firm*—Robert P. Seitter; J. Gordon Lewis

[57] ABSTRACT

A layered tubing for use in a motor vehicle composed of a thick outer tubing having an inner and an outer face, the outer tubing made of an extrudable thermoplastic such as a polyamide like Nylon 12; a thin intermediate bonding layer bonded to the inner face of the thick outer layer, the bonding layer composed of an extrudable melt-processible thermoplastic capable of sufficiently permanent laminar adhesion with the thick outer layer which is chemically dissimilar to the thermoplastic employed in the thick outer layer; an interior layer bonded to the intermediate bonding layer, the interior layer composed of a fluoroplastic which is resistant to permeation by and interaction with short-chain aliphatic and aromatic compounds; and an innermost electrostatic discharge layer.

18 Claims, 1 Drawing Sheet

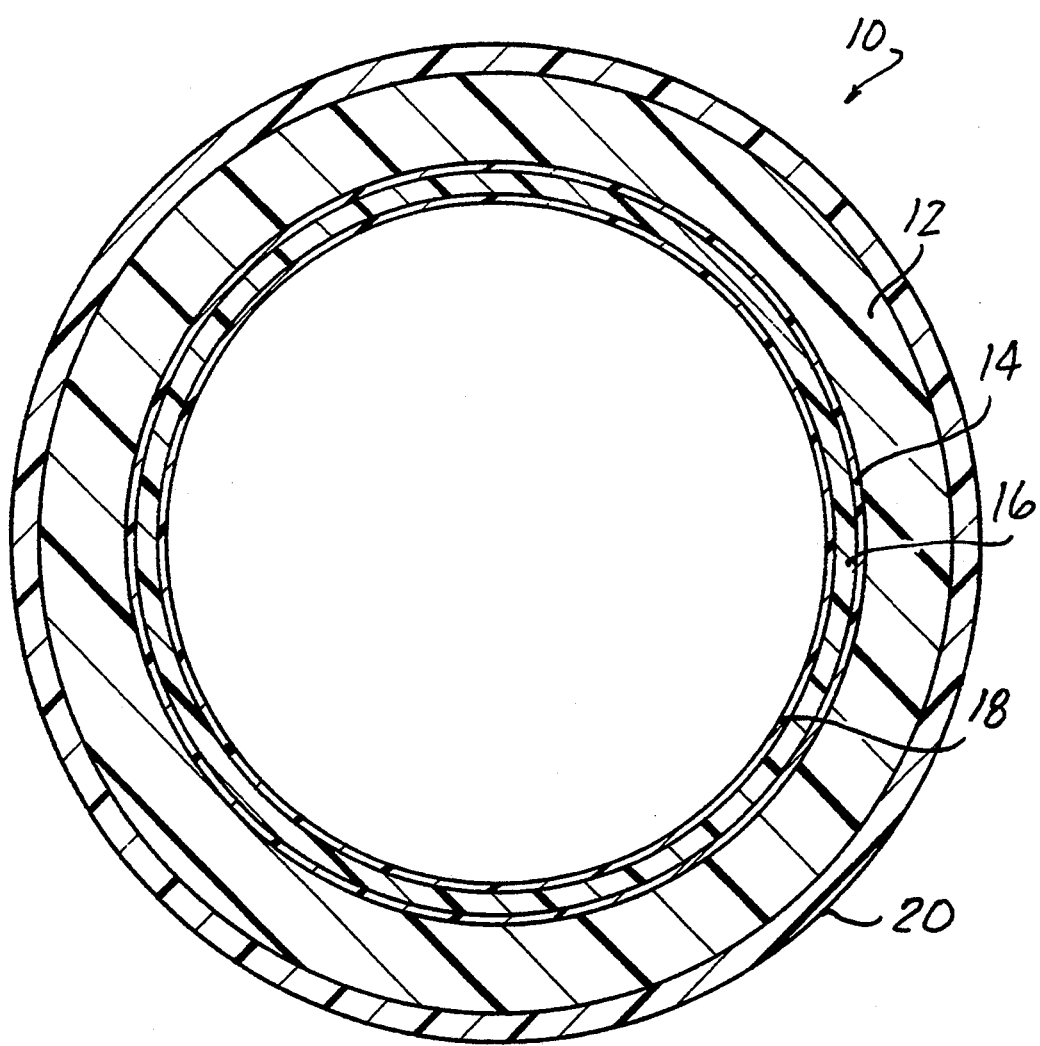

MULTI-LAYER FUEL AND VAPOR TUBE

RELATED APPLICATIONS

This application is a continuation-in-part of Ser. No. 07/868,754, filed Apr. 14, 1992 currently pending before the United States Patent and Trademark Office. This application is one of a series of four applications dispatched for filing in the United States Patent and Trademark Office on Jun. 11, 1992 U.S. Ser. Nos. 07/897,304; 07/897,302; and 07/897,376, all of which are currently pending before the United States Patent and Trademark Office.

FIELD OF THE INVENTION

The present invention relates to a hose for use in a motor vehicle. More particularly, the present invention relates to a multi-layer hose which can be employed as a fuel line or vapor recovery line in a motor vehicle.

BACKGROUND OF THE INVENTION

Single layer fuel lines and vapor return lines of synthetic materials such as polyamides have been proposed and employed in the past. Fuel lines employing such materials generally have lengths of at least several meters. It is important that the line, once installed, not materially change during the length of operation, either by shrinkage or elongation or as a result of the stresses to which the line may be subject during use.

It is also becoming increasingly important that the lines employed be essentially impervious to hydrocarbon emissions due to permeation through the tubing. It is anticipated that future Federal and state regulations will fix the limit for permissible hydrocarbon emissions due to permeation through such lines. Regulations which will be enacted in states such as California will fix the total passive hydrocarbon emission for a vehicle at 2 g/m$^2$ per 24 hour period as calculated by evaporative emission testing methods such as those outlined in Title 13 of the California Code of Regulations, section 1976, proposed amendment of Sep. 26, 1991. To achieve the desired total vehicle emission levels, a hydrocarbon permeation level for the lines equal to or below 0.5 g/m$^2$ per 24 hour period would be required.

Finally, it is also imperative that the fuel line employed be impervious to interaction with corrosive materials present in the fuel such as oxidative agents and surfactants as well as additives such as ethanol and methanol.

Various types of tubing have been proposed to address these concerns. In general, the most successful of these have been co-extruded multi-layer tubing which employ a relatively thick outer layer composed of a material resistant to the exterior environment. The innermost layer is thinner and is composed of a material which is chosen for its ability to block diffusion of materials such as aliphatic hydrocarbons, alcohols and other materials present in fuel blends, to the outer layer. The materials of choice for the inner layer are polyamides such as Nylon 6, Nylon 6.6, Nylon 11, and Nylon 12.

Alcohol and aromatics in the fluid conveyed through the tube diffuse at different rates through the tubing wall from the aliphatic components. The resulting change in the composition of the liquid in the tubing can change the solubility thresholds of the material so as, for example, to be able to crystalize monomers and oligomers of materials such as Nylon 11 and Nylon 12 into the liquid. The presence of copper ions, which can be picked up from the fuel pump, accelerates this crystallization. The crystallized precipitate can block filters and fuel injectors and collect to limit travel of the fuel-pump or carburetor float as well as build up on critical control surfaces of the fuel pump.

In U.S. Pat. No. 5,076,329 to Brunnhofer, a five-layer fuel line is proposed which is composed of a thick outer layer formed of Nylon 11 or Nylon 12, a thick intermediate layer of Nylon 6, and a thin intermediate bonding layer between and bonded to the intermediate and outer layers formed of a polyethylene or a polypropylene. On the interior of the tube is an inner layer of Nylon 6 with a thin intermediate solvent-blocking layer formed of an ethylene-vinyl alcohol copolymer transposed between. The use of Nylon 6 in the inner fluid contacting surface is designed to eliminate at least a portion of the monomer and oligomer dissolution which occurs with Nylon 11 or Nylon 12.

In U.S. Pat. No. 5,038,833 to Brunnhofer, a three-layer fuel line is proposed in which a tube is formed having a co-extruded outer wall of Nylon 11 or Nylon 12, an intermediate alcohol barrier wall formed from an ethylene-vinyl alcohol copolymer, and an inner water-blocking wall formed from a polyamide such as Nylon 11 or Nylon 12. In DE 40 06 870, a fuel line is proposed in which an intermediate solvent barrier layer is formed of unmodified Nylon 6.6 either separately or in combination with blends of polyamide elastomers. The internal layer is also composed of polyamides; preferably modified or unmodified Nylon 6, while the outer layer is composed of either Nylon 6 or Nylon 12.

Another tubing designed to be resistant to alcoholic media is disclosed in UK Application Number 2 204 376 A in which a tube is produced which has a thick outer layer composed of polyamides such as Nylon 6 or 6.6 and/or Nylon 11 or 12 which are co-extruded with an alcohol-resistant polyolefin, a co-polymer of propylene and maleic acid.

Heretofore it has been extremely difficult to obtain satisfactory lamination characteristics between dissimilar polymer layers. Thus all of the multi-layer tubing proposed previously have employed polyamide-based materials in most or all of the multiple layers. While many more effective solvent-resistant chemicals exist, their use in this area is limited due to limited elongation properties, strength and compatibility with Nylon 11 and 12. Additionally, the previous disclosures fail to address or appreciate the phenomenon of electrostatic discharge.

Electrostatic discharge can be defined as the release of electric charge built up or derived from the passage of charged particles through a medium or conduit composed of essentially non-conductive materials. The electrostatic charge is repeatedly replenished with the passage of additional volumes of fuel through the conduit. Discharge repeatedly occurs in the same localized area gradually eroding the area and leading to eventual rupture. This in turn, leads to the danger of fire and explosion of the flammable contents of the tubing.

Thus it would be desirable to provide a tubing material which could be employed in motor vehicles which would be durable and prevent or reduce permeation of organic materials therethrough. It would also be desirable to provide a tubing material which would be essentially nonreactive with components of the liquid being conveyed therein. Finally, it would be desirable to provide a tubing material which would be capable of preventing the build-up of electrostatic discharge therein or would be capable of safely dissipating any electrostatic charge induced therein.

SUMMARY OF THE INVENTION

The present invention is a multi-layer tube which can be used on motor vehicles for applications such as in a fuel line system or a vapor recovery or return line system. The tube of the present invention is composed of:
- a thick outer tubing having a given thickness and an inner and an outer face, the outer tubing consisting essentially of an extrudable thermoplastic having an elongation value of at least 150% and an ability to withstand impacts of at least 2 foot pounds at temperatures below about −20° C.;
- a thin intermediate bonding layer bonded to the inner face of the thick outer layer, the bonding layer consisting essentially of an extrudable melt-processible thermoplastic capable of sufficiently permanent laminar adhesion to the outer layer;
- an interior layer bonded to the intermediate bonding layer, the interior layer consisting essentially of an extrudable, melt-processible thermoplastic material capable of sufficiently permanent laminar adhesion with the intermediate bonding layer, the thermoplastic material containing as a major constituent, a thermoplastic which is chemically dissimilar to the thermoplastic employed in the thick outer layer, the chemically dissimilar thermoplastic being resistant to permeation and interaction with short chain aliphatic and aromatic compounds; and
- an innermost electrostatic discharge layer integrally bonded to the multi-layer tubing, the electrostatic discharge layer consisting essentially of an extrudable, melt-processible thermoplastic material having an electrostatic dissipation capacity in a range between about $10^{-4}$ and about $10^{-9}$ ohm/cm$^2$.

DESCRIPTION OF THE DRAWING

The objects, features and advantages of the present invention will become more readily apparent from the following description, reference being made to the following drawing in which the FIGURE is a sectional view through a piece of tubing of the present invention.

DESCRIPTION OF THE PREFERRED EMBODIMENT

The present invention is a multi-layer fuel line and vapor tube which contains at least one bonding layer, at least an outer and an inner hydrocarbon barrier layer, and at least one conductive layer. The tubing of the present invention is, preferably, fabricated by co-extruding given thermoplastic materials in a conventional co-extrusion process. The tubing may either be co-extruded to a suitable length or may be co-extruded in continuous length and cut to fit the given application subsequently. The tubing of the present invention may have an outer diameter up to 50 mm. However, in applications such as fuel lines and vapor recovery systems, outer diameters up to 2.5 inches are preferred.

The material may have any suitable wall thickness desired. However, in automotive systems such as those described herein, wall thicknesses between 0.5 mm and 2 mm are generally employed with wall thicknesses of approximately 0.8 to 1.5 mm being preferred. While it is within the scope of this invention to prepare a tubing having a plurality of overlaying layers of various thermoplastic materials, the tubing of the present invention generally has a maximum of four or five layers inclusive of the bonding layers. In the preferred embodiment, the tubing material has five layers.

The tubing 10 of the present invention is a material which is suitable for use in motor vehicles and comprises a relatively thick outer layer which is non-reactive with the external environment and can withstand various shocks, vibrational fatigue, and changes in temperature as well as exposure to various corrosive or degradative compounds to which it would be exposed through the normal course of operation of the motor vehicle.

It is anticipated that both the outer tubing layer 12 as well as any interior layers bonded thereto would be suitable for use at an outer service temperature range between about −40° C. and about 150° C., with a range of −20° C. to 120° C. being preferred. The various layers of tubing are integrally laminated to one another and resistant to delamination throughout the lifetime of the tubing. The tubing thus formed will have a tensile strength of no less than 25N/mm$^2$ and an elongation value of at least 150%. The tubing will have a burst strength at 23° C. and 120° C. of at least 20 bar. The multi-layer tubing of the present invention is sufficiently resistant to exposure to brake fluid, engine oil and peroxides such as those which may be found in gasoline.

The outer layer 12 may be composed of any melt-processible extrudable thermoplastic material which is resistant to ultra violet degradation, extreme changes in heat, exposure to environmental hazards such as zinc chloride, and degradation upon contact with engine oil and brake fluid. In general, the exterior layer is selected from the group consisting of 12 carbon block polyamides, 11 carbon block polyamides and zinc chloride resistant 6 carbon block polyamides thermoplastic elastomers. These thermoplastic elastomers are proprietary compositions and commercially available under tradenames such as SANTOPRENE, KRATON, SARLINK and VICHEM. These materials which compose the outer layers can be present in their unmodified state or can be modified with various plasticizers, flame retardants and the like in manners which would be known to one reasonably skilled in the art.

In the preferred embodiment, a polyamide such as Nylon 12 can be effectively employed. It is anticipated that the Nylon 12 may be either modified or unmodified. If modified, it is anticipated that the material will contain various plasticizers as are readily known in the art.

The Nylon 12 outer layer 12 preferably has a wall thickness between about 0.5 mm and about 0.8 mm with a preferred range being between about 0.6 and about 0.75 mm. As indicated previously, the material is extruded by conventional co-extrusion methods to any continuous length desired.

The tubing 10 of the present invention includes an intermediate bonding layer 14 adhering and attached to the inner surface of the thick outer layer 12. The intermediate bonding layer 14 may be co-extruded with the other layers and is composed of a material which is capable of achieving a suitable homogeneous bond between itself, the thick outer layer and any inner layers interposed thereon. The intermediate bonding layer 14 is generally composed of a more elastic material than that employed in inner layers, the compositions of which will be described subsequently.

In the preferred embodiment, the intermediate bonding layer 14 is composed of a thermoplastic material which may exhibit properties of resistance to the permeation of aliphatic and aromatic materials such as those found in fuel in addition to exhibiting suitable bonding characteristics. The thermoplastic material employed herein is preferably a melt-processible co-extrudable fluoroplastic blend which will exhibit an affinity to conventional polymers such as Nylon 12, and may optionally contain various plasticizers and other modifying agents. The fluoroplastic which comprises the intermediate bonding layer 14 consists essentially of: a polyvinyl fluoride compound selected from the group consisting of polyvinylidine fluoride polymers, polyvinyl fluoride polymers, and mixtures thereof; a vinylidine fluoride-chlorotrifluoroethylene copolymer; and a polyamide material selected from the group consisting of 12 carbon block polyamides, 11 carbon block polyamides, 6 carbon block polyamides, and mixtures thereof. The vinylidine fluoride-chlorotrifluoroethylene copolymer preferably, contains between about 60% and about 80% by weight polyvinylidine difluoride. In the preferred embodiment, the intermediate bonding layer 14 consists essentially of between about 35% and about 45% by weight of a copolymer of vinylidinefluoride and chlorotrifluoroethylene; between 25% and about 35% by weight polyvinylidine fluoride; and between about 25% and about 35% by weight of a polyamide selected from the group consisting of 12 carbon block polyamides, 11 carbon block polyamides, and mixtures thereof. One such polymeric material suitable for use in the multi-layer tubing of the present invention is commercially available from Central Glass of Ube City, Japan under the trade designation CEFRAL SOFT XUA-2U. This proprietary material is a graft copolymer of a fluorine-containing elastomeric polymer with a fluorine-containing crystalline polymer. The elastomeric polymer is, preferably, a material copolymerized from an alkyl difluoride selected from the group consisting of vinyl difluoride, vinylidine difluoride, and mixtures thereof, and a chlorofluoroalkene selected from the group consisting of ethylene chlorotrifluoroethylene. The crystalline polymer is preferably a haloalkene such as ethylene chlorotrifluoroethylene.

In the preferred embodiment, the bonding layer 14 is the product of the copolymerization of ethylene chlorotrifluoroethylene and a vinylidine difluoride chlorotrifluoroethylene copolymer having a melting point between about 180° C. and about 210° C. and a molding temperature between about 230° C. and about 260° C.

The interior layer 16 is integrally bonded onto the inner surface of the thick outer polyamide layer by means of the intermediate bonding layer 14. In the present invention, the interior layer 16 is a chemically dissimilar permeation resistant, chemical resistant, fuel resistant thermoplastic material which is melt-processible in normal ranges of extrusion, i.e. about 175° to about 250° C. By the term "chemically dissimilar" it is meant that the interior layer 16 is a non-polyamide material which is capable of adhesion to the intermediate bonding layer 14 interposed between the thick outer layer 12 and the interior layer 16.

In the preferred embodiment, the thermoplastic material which comprises the interior layer 16 is selected from the group consisting of polyvinylidine fluoride, polyvinyl fluoride, and mixtures thereof. The material can also be a graft copolymer of the preceding materials together with a fluorine-containing polymer such as copolymers of vinylidine fluoride and chlorotrifluoroethane. Suitable material employed would contain between about 60% and about 80% by weight polyvinylidine difluoride. Materials so formed have a melting point between about 200° C. and about 220° C. and a molding temperature between about 210° C. and about 230° C.

The multi-layer tubing of the present invention also includes an innermost electrostatic dissipation layer 18 which is also capable of serving as a hydrocarbon barrier to assist in the prevention of permeation of aromatic and aliphatic compounds found in gasoline through to the outer layer 12 of the tubing and, thus, out to the surrounding environment.

In the preferred embodiment, the innermost layer 18 is integrally bonded to the inner surface of the interior layer 16. In the present invention, the innermost layer 18 is composed of a thermoplastic material chemically dissimilar to the thermoplastic material employed in the outer layer 12 which is melt-processible in the normal ranges of extrusion, i.e. about 175° C. to about 250° C. The thermoplastic material employed in the innermost layer 18 which is capable of sufficiently permanent laminar adhesion to the interior layer 16.

In the preferred embodiment, the thermoplastic material which comprises the innermost layer 18 consists essentially of: a copolymer of a vinyl fluoride and chlorotrifluoroethylene, the vinyl fluoride material selected from the group consisting of polyvinylidine fluoride, polyvinyl fluoride, and mixtures thereof; a copolymer of a vinyl fluoride material and ethylene tetrafluoroethylene; and a non-fluorinated elastomer. The thermoplastic material employed in the present invention, preferably contains between about 10% and about 18% by weight of a vinylidine fluoride-chlorotrifluoroethylene copolymer which itself has a vinylidine fluoride content between about 40% and 60% by copolymer weight. The material also, preferably contains between about 50% and about 70% by weight of a vinylidine fluoride-tetrafluoroethylene copolymer. The non-fluorinated elastomer is selected from the group consisting of polyurethanes, and mixtures thereof. In the preferred embodiment, the material contains between about 10% and about 25% by weight polyurethane.

The material also contains conductive media in quantities sufficient to permit electrostatic dissipation in a desired range. In the preferred embodiment, the innermost layer 18 exhibits electrostatic conductive characteristics in that it is capable of dissipation of electrostatic charge in the range of $10^{-4}$ to $10^{-9}$ ohm/cm$^2$. The conductive material employed may be any suitable material of a composition and shape capable of effecting this static dissipation. The conductive material may be selected from the group consisting of elemental carbon, stainless steel and highly conductive metals such as copper, silver, gold, nickel, silicon and mixtures thereof. The term "elemental carbon" as used herein is employed to describe and include materials commonly referred to as "carbon black". The carbon black can be present in the form of carbon fibers, powders, spheres, and the like.

The amount of conductive material contained in the fluoroplastic is generally limited by considerations of low temperature durability and resistance to the degradative effects of the gasoline or fuel passing through the tubing. In the preferred embodiment, the fluoroplastic material contains conductive material in an amount sufficient to effect electrostatic dissipation. However, the maximum amount employed therein is less than 5% by volume with a concentration between about 2% and about 4% being preferred.

The conductive material can either be interstitially integrated into the crystalline structure of the polymer or can be co-polymerized therewith. Without being bound to any theory, it is believed that carbon-containing materials such as carbon black may be subject to carbon co-polymerization with the surrounding fluoroplastic material. Material such as stainless steel are more likely to be interstitially integrated into the crystalline structure of the polymer. Suitable material is commercially available under the tradename XPV-504KRC CEFRAL SOFT CONDUCTIVE.

In the preferred embodiment, the innermost layer 18 is maintained at thicknesses suitable for achieving static dissipation and suitable laminar adhesion respectively; generally between about 10% and 20% of the thick outer layer. The thickness of the innermost layer 18 is preferably between about 0.1 mm and about 0.2 mm. The intermediate bonding layer preferably has a thickness approximately equal to the thickness of the innermost layer preferably between about 0.05 mm and about 0.15 mm.

The interior layer 16 is maintained at a thickness suitable to achieve a hydrocarbon permeation value for the tubing of the present invention no greater than about 0.5 $g/m^2$ in a 24 hour interval. To accomplish this, the characteristics of the interior layer 16 can be relied upon solely or in concert with the intermediate bonding layer. It is anticipated that the thickness of the interior and intermediate layers can be modified to accomplish this end. In the preferred embodiment, the interior layer 16 has a thickness between about 10% and about 20% of the thick outer layer. In the preferred embodiment, the interior layer has a thickness between about 0.15 mm and about 0.25 mm with a thickness of about 0.18 mm to about 0.22 mm being preferred. The intermediate bonding layer 14 is maintained at a thickness sufficient to permit sufficient laminar adhesion between the outer and interior layers. The intermediate bonding layer generally has a thickness less than that of the inner layer 16. The thickness of this layer is, preferably, between about 0.05 and about 0.1

The total wall thickness of the tubing of the present invention is generally between about 0.5 mm and about 2.0 mm with a wall thickness between about 0.8 and about 1.25 mm being preferred.

The tubing of the present invention may also, optionally include an outer jacket 20 which surrounds the outer layer. The outer jacket may be either co-extruded with the other layers during the extrusion process or may be put on in a subsequent process such as cross-extrusion. The outer jacket may be made of any material chosen for its structural or insulating characteristics and may be of any suitable wall thickness. In the preferred embodiment, the outer jacket may be made of a thermoplastic material selected from the group consisting of zinc-chloride resistant Nylon 6, Nylon 11, Nylon 12, polypropylene, and thermoplastic elastomers such as SANTOPRENE, KRATON, VICHEM and SARLINK. If desired, these materials may be modified to include flame retardants, plasticizers and the like.

While preferred embodiments, forms and arrangements of parts of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A layered tubing for use in a motor vehicle, the tubing comprising:

a thick flexible outer tubing layer having a given thickness and an inner and an outer face, the outer tubing consisting essentially of an extrudable thermoplastic having an elongation value of at least 150% and an ability to withstand impacts of at least 2 foot-pounds at temperatures below about $-20°$ C.;

an intermediate bonding layer bonded to the inner face of the thick outer layer, the bonding layer consisting essentially of an extrudable melt processible thermoplastic capable of sufficiently permanent laminar adhesion to the inner face of the outer tubing;

an interior layer bonded to the intermediate bonding layer, the interior layer consisting essentially of an extrudable, melt-processible thermoplastic material capable of sufficiently permanent laminar adhesion with the intermediate bonding layer, the melt-processible thermoplastic which is chemically dissimilar to the thermoplastic employed in the thick outer layer, the chemically dissimilar thermoplastic being resistant to permeation by and interaction with short-chain aliphatic and aromatic hydrocarbon compounds; and an innermost electrostatic dissipation layer integrally bonded to the interior layer, the electrostatic dissipation layer consisting of an extrudable, melt-processible thermoplastic material capable of sufficiently permanent laminar adhesion with the intermediate bonding layer and of dissipating electrostatic energy, the electrostatic dissipation capacity being in a range between about $10^{-4}$ to $10^{-9}$ $ohm/cm^2$.

2. The multi-layer tubing of claim 1 wherein the interior layer is a composed of thermoplastic material consisting essentially of a fluoroplastic material selected from the group consisting of polyvinylidine fluoride, polyvinyl fluoride, and mixtures thereof.

3. The multi-layer tubing of claim 2 wherein the fluoroplastic material further consists of copolymers of vinylidine difluoride and chlorotrifluoroethane copolymerized with polyvinylidine fluoride, copolymers of vinylidine difluoride and chlorotrifluoroethane copolymerized with polyvinyl fluoride, and mixtures thereof.

4. The multi-layer tubing of claim 2 wherein the interior layer has a thickness between about 10% and about 20% of the thick outer layer.

5. The multi-layer tubing of claim 1 wherein the innermost electrostatic dissipation layer consists of a thermoplastic material which is chemically dissimilar to the thick outer layer.

6. The multi-layer tubing of claim 5 wherein the innermost electrostatic dissipation layer is composed of a thermoplastic material consisting essentially of:

a copolymer of a vinyl fluoride and chlorotrifluoroethylene, the vinyl fluoride material selected from the group consisting of polyvinylidine fluoride, polyvinyl fluoride, and mixtures thereof;

a copolymer of a vinyl fluoride material and ethylene tetrafluoroethylene;

a non-fluorinated elastomer comprising polyurethane; and a conductive material in a quantity sufficient to provide electrostatic dissipation capability in a range between about $10^{-4}$ and about $10^{-9}$ ohm/cm$^2$.

7. The multi-layer tubing of claim 6 wherein the electrostatic dissipation layer consists essentially of:
   between about 10% and about 18% by weight of a vinylidine fluoride-chlorotrifluoroethylene copolymer, the copolymer having between about 40% and 60% by weight vinylidine fluoride;
   between about 50% and about 70% by weight of a vinylidine fluoride-tetrafluoroethylene copolymer, the copolymer having between about 40% and about 60% by weight vinylidine fluoride; and
   between about 10% and about 25% by weight polyurethane.

8. The tubing of claim 6 wherein the conductive material is selected from the group consisting of elemental carbon, copper, silver, gold, nickel, silicon, and mixtures thereof.

9. The tubing of claim 6 wherein the conductive material is present in an amount less than about 5% by volume of the electrostatic dissipation layer thermoplastic material.

10. The tubing of claim 6 wherein the conductive material is interstitially integrated into the electrostatic dissipation layer thermoplastic material.

11. The multi-layer tubing of claim 5 wherein the innermost electrostatic dissipation layer has a thickness between about 10% and about 20% of the thick outer layer.

12. The multi-layer tubing of claim 1 wherein the bonding layer is a thermoplastic material consisting essentially of:
   a polyvinyl fluoride compound selected from the group consisting of polyvinylidine fluoride polymers, polyvinyl fluoride polymers, and mixtures thereof;
   a vinylidine fluoride-chlorotrifluoroethylene copolymer; and
   a polyamide material selected from the group consisting of 12 carbon block polyamides, 11 carbon block polyamides, 6 carbon block polyamides, and mixtures thereof.

13. The tubing of claim 12 wherein the bonding layer consists essentially of:
   between about 35% and about 45% by weight of a copolymer of vinylidinefluoride and chlorotrifluoroethylene;
   between 25% and about 35% by weight polyvinylidine fluoride; and
   between about 25% and about 35% by weight of a polyamide selected from the group consisting of 12 carbon block polyamides, 11 carbon block polyamides, and mixtures thereof.

14. The tubing of claim 1 wherein the extrudable thermoplastic of the thick outer tubing layer is a thermoplastic selected from the group consisting of Nylon 11, Nylon 12, zinc chloride resistant Nylon 6, and mixtures thereof.

15. The tubing of claim 1 further comprising an exterior jacket overlying the thick outer tubing, the exterior jacket composed of a material consisting essentially of a thermoplastic material selected from the group consisting of Nylon 11, Nylon 12, zinc chloride resistant Nylon 6, polypropylene, and mixtures thereof.

16. A layered tubing for use in a motor vehicle, the tubing comprising:
   a thick flexible outer tubing having a given thickness and an inner and an outer face, the outer tubing consisting essentially of an extrudable polyamide having an elongation value of at least 150% and an ability to withstand impacts of at least 2 foot-pounds at temperatures below about $-20°$ C.;
   an intermediate bonding layer having a thickness between about 0.05 mm and about 0.1 mm bonded to the inner face of the thick outer layer, the bonding layer consisting essentially of an extrudable thermoplastic capable of sufficiently permanent laminar adhesion to the polyamide outer tubing;
   an interior layer bonded to the intermediate bonding layer, the interior layer having a thickness between about 0.05 mm and about 0.15 mm and consisting essentially of an extrudable, melt-processible thermoplastic material capable of sufficiently permanent laminar adhesion with the intermediate bonding layer, the melt-processible thermoplastic resistant to permeation by and interaction with short-chain aliphatic and aromatic hydrocarbon compounds selected from the group consisting of polyvinylidine fluoride, polyvinyl fluoride, copolymers of vinylidine difluoride and chlorotrifluoroethane copolymerized with polyvinylidine fluoride, copolymers of vinylidine difluoride and chlorotrifluoroethane copolymerized with polyvinyl fluoride, and mixtures thereof; and
   an innermost electrostatic dissipation layer integrally bonded to the interior layer, the electrostatic dissipation layer having a thickness between about 0.1 mm and about 0.2 mm and consisting essentially of an extrudable, melt-processible thermoplastic material capable of sufficiently permanent laminar adhesion with the intermediate bonding layer and of dissipating electrostatic energy, the electrostatic dissipation capacity being in a range between about $10^{-4}$ and about $10^{-9}$ ohm/cm$^2$, the melt-processible thermoplastic consisting essentially of:
   between about 10% and about 18% by weight of a vinylidine fluoride-chlorotrifluoroethylene copolymer, the copolymer having between about 40% and 60% by weight vinylidine fluoride;
   between about 50% and about 70% by weight of a vinylidine fluoride-tetrafluoroethylene copolymer, the copolymer having between about 40% and about 60% by weight vinylidine fluoride; and
   between about 10% and about 25% by weight polyurethane.

17. The tubing of claim 16 wherein the extrudable thermoplastic of the thick outer tubing is a polyamide selected from the group consisting of Nylon 11, Nylon 12, zinc chloride resistant Nylon 6, and mixtures thereof.

18. The tubing of claim 16 further comprising an exterior jacket overlying the thick outer tubing, the exterior jacket composed of a material consisting essentially of a thermoplastic material selected from the group consisting of Nylon 11, Nylon 12, zinc chloride resistant Nylon 6, polypropylene, and mixtures thereof.

* * * * *